Sept. 12, 1950            F. W. MERRILL            2,522,233
ROTOR FOR PERMANENT MAGNET DYNAMOELECTRIC MACHINES
Filed Dec. 18, 1948            2 Sheets-Sheet 1
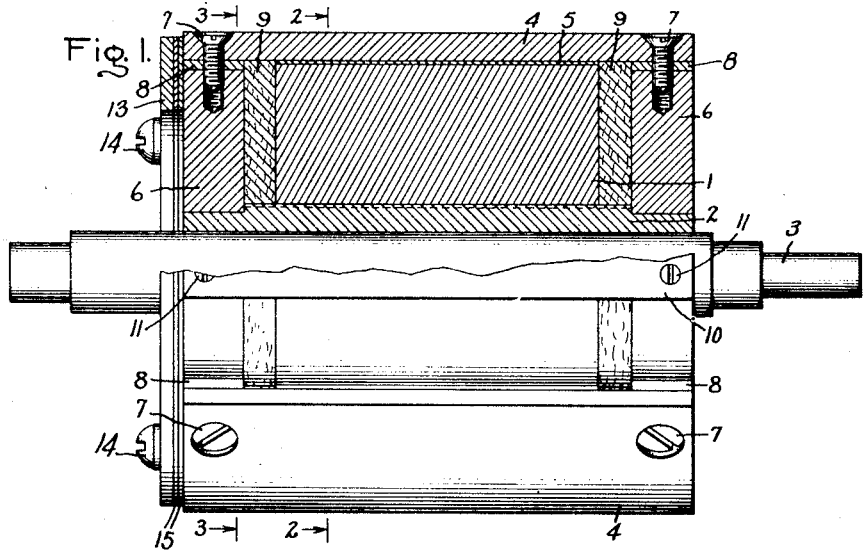
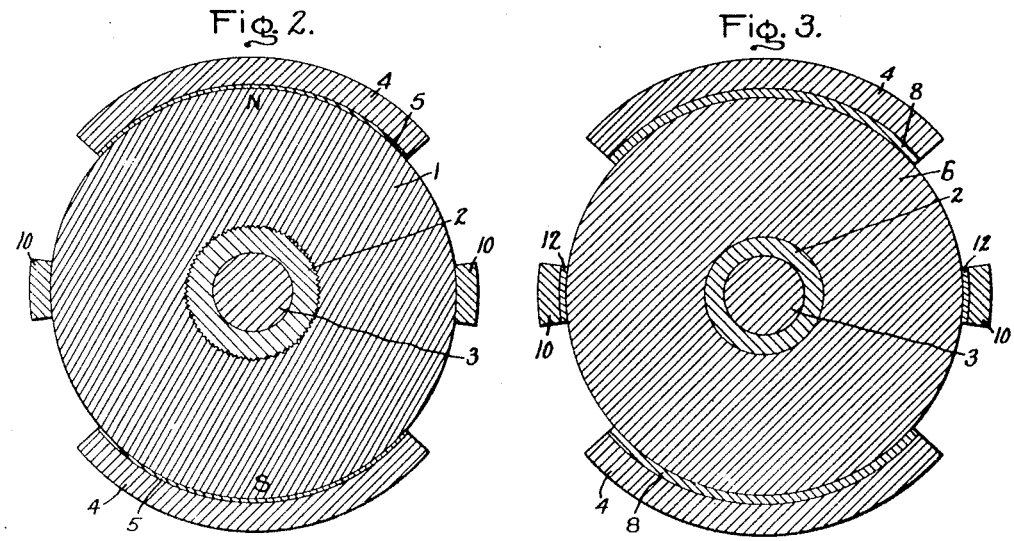
Inventor:
Frank W. Merrill,
by *Travell & Mack*
His Attorney.

Sept. 12, 1950  F. W. MERRILL  2,522,233
ROTOR FOR PERMANENT MAGNET DYNAMOELECTRIC MACHINES
Filed Dec. 18, 1948  2 Sheets-Sheet 2
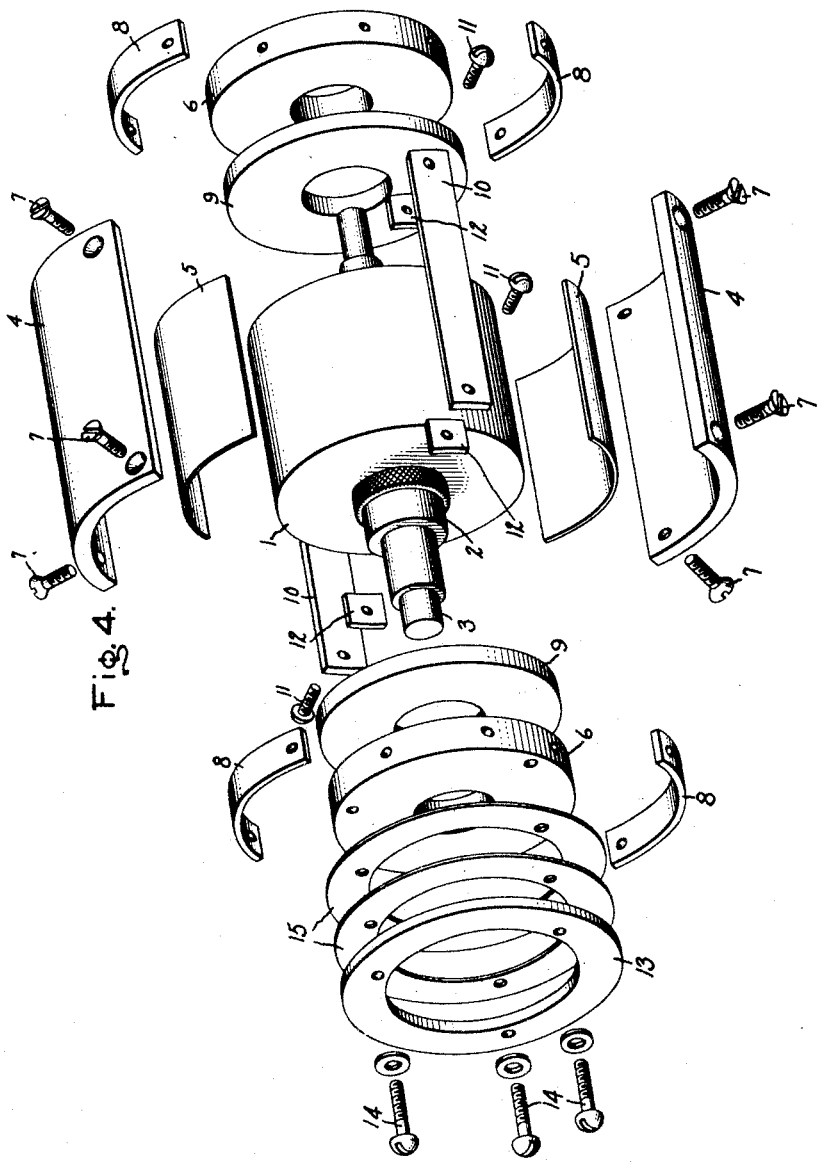
Inventor:
Frank W. Merrill,
by  Purcell S. Mack
His Attorney.

Patented Sept. 12, 1950

2,522,233

UNITED STATES PATENT OFFICE 2,522,233

ROTOR FOR PERMANENT MAGNET
DYNAMOELECTRIC MACHINES

Frank W. Merrill, Fort Wayne, Ind., assignor to General Electric Company, a corporation of New York Application December 18, 1948, Serial No. 66,028

6 Claims. (Cl. 171—209)

This invention relates to dynamoelectric machines having permanent magnet excitation and more particularly to permanent magnet rotors for such machines.

Permanent magnet rotors have heretofore been frequently used in small dynamoelectric machines, and in the design of these rotors, it is particularly important to provide maximum effective flux density in the pole pieces. In conventional dynamoelectric machines with permanent magnet rotors, it is customary to first magnetize the rotor with a suitable device and then expose it to an open air condition of high external reluctance so that the rotor is air stabilized prior to assembly in the stator. When the rotor is exposed in this manner, the magnet flux density drops to a fairly low point on the demagnetization curve of the major hysteresis loop in the second quadrant. However, when the rotor is positioned in the stator with an accompanying greatly reduced external reluctance, the magnet flux density rises along the minor loop to a predetermined point sufficient to supply the operating flux of the machine. Such a rotor may be thereafter removed from and replaced in the stator repeatedly without loss of flux, providing, however, that it is not subjected to a greater demagnetizing force than that of the original open air reluctance. The minor loop followed by the magnet flux density as a result of the air exposure, is, however, so low that a relatively large amount of magnet material must be used to produce a given working flux. This condition may be greatly improved by providing the rotor magnet with a fixed shunt flux path of a somewhat greater reluctance than the reluctance of the working air gap to carry the magnet flux when the rotor is not positioned in the stator. This shunt flux path is in parallel with the working flux path through the air gap and, when the rotor is positioned in the stator, by-passes only a small proportion of the total flux since the shunt gap reluctance is larger than the working gap reluctance between the rotor and stator. However, when the rotor is not positioned in the stator, the rotor shunt air gap provides a path of comparatively low reluctance so that the flux density does not drop to as low a point on the major hysteresis loop as before and the operating range is along a minor hysteresis loop at a considerably higher flux level than would be possible if the shunt air gap were not provided. Thus, the magnet flux density is held at a higher level when the rotor is removed from or replaced in the stator than would otherwise be the case and, therefore, more working flux is available from a given size magnet or the size of the magnet can be reduced to deliver a required amount of flux. It has also been found desirable to provide means for conveniently adjusting the output voltage of the machine and to accomplish this object, adjustable means are provided to by-pass any excess flux around the shunt air gap.

An object of this invention is to provide an improved permanent magnet rotor for dynamoelectric machines.

Another object of this invention is to provide an improved permanent magnet rotor for dynamoelectric machines wherein the magnet flux density is held at a high level when the rotor is removed from or replaced in the stator.

A further object of this invention is to provide an improved permanent magnet rotor for dynamoelectric machines wherein a shunt air gap is provided to hold the magnet flux density at a high level when the rotor is removed from or replaced in the stator.

A still further object of this invention is to provide an improved permanent magnet rotor for dynamoelectric machines wherein means are provided to adjust the output voltage.

Further objects and advantages of this invention will become apparent and the invention will be better understood by reference to the following description and the accompanying drawings. The features of novelty which characterize this invention will be pointed out with particularity in the claims annexed to and forming part of this specification.

In accordance with this invention, there is provided a permanent magnet rotor for dynamoelectric machines having a permanent magnet secured to a shaft member and polarized radially forming polar areas at its outer periphery. Flux concentrating pole pieces are positioned on the outer periphery of the magnet abutting the polar areas and extending axially beyond both ends of the magnet. A pair of end plates formed of magnetic material are respectively mounted on the shaft member at either end of the permanent magnet and spaced therefrom. These end plates form a shunt air gap with the pole pieces which is of greater reluctance than the working air gap between the rotor and stator. Non-magnetic spacers are provided between the end plates and the pole pieces and the pole pieces are secured to the end plates by means of non-magnetic screws. The generated voltage of the machine is regulated by means of a conducting ring mounted on one end of the rotor which bypasses excess flux around the shunt gap.

In the drawings, Fig. 1 is a side elevational view, partly in section, illustrating the improved permanent magnet rotor of this invention; Fig. 2 is a cross-sectional view taken along the line 2—2 of Fig. 1; Fig. 3 is a cross-sectional view taken along the line 3—3 of Fig. 1; and Fig. 4 is an exploded view illustrating the assembly of this improved permanent magnet rotor.

Referring now to the drawings, there is shown a cylindrical permanent magnet 1 which is cast on a sleeve or hollow shaft member 2 formed of magnetic material such as steel. The sleeve 2 has a knurl formed on its outer periphery so as to firmly hold the magnet casting in place. After the permanent magnet 1 is cast on the sleeve 2, the outer periphery of the permanent magnet is machined and the inside of the sleeve 2 is bored to receive the rotor shaft 3. The permanent magnet 1 is then magnetized radially to form polar areas, indicated by "N" and "S" in Fig. 2 of the drawing, at its outer periphery. The permanent magnet 1 is preferably formed of a permanent magnet steel having a relatively high coercive force, such as the aluminum, nickel, cobalt, and iron, permanent magnet alloys, described in Mishima Patents 2,027,994 through 2,028,000, inclusive, and Jonas Patent 2,295,082, all assigned to assignee of the present invention. Pole pieces 4 formed of magnetic material are positioned on the outer periphery of the permanent magnet 1 adjacent the salient pole portions. Due to variations in casting, it has been found necessary to provide shims 5 between the pole pieces 4 and the outer periphery of the permanent magnet 1 in order to secure the requisite air gap between the outer periphery of the pole pieces 4 and the inner periphery of the stator (not shown), without the necessity of grinding the outer diameter of the permanent magnet 1 to an exact dimension. The shims may be formed of magnetic material such as steel or may be a magnetic cement. The pole pieces 4, which provide for the concentration of the permanent magnet flux, extend axially beyond both sides of the permanent magnet 1. A pair of end plates 6 formed of conductive material such as low carbon steel are secured to the sleeve 2. These end plates are slightly smaller in diameter than the diameter of the permanent magnet 1 and shims 5. The pole pieces 4 are secured to the end plates 6 by non-magnetic screws 7 and shims 8 formed of non-magnetic material, such as copper, are positioned between the ends of the pole pieces 4 and the outer periphery of the end plates 6. The air gap formed between the pole pieces 4 and the end plates 6 provides the desired shunt flux path to insure a higher magnet flux density both in and out of the stator. This shunt air gap has a greater reluctance than the working air gap of the machine between the pole faces 4 and the stator. The non-magnetic shims 8 prevent any magnetic material from becoming lodged in the gap. The end plates 6 are spaced from the ends of the permanent magnet 1 and the resulting space is filled by a felt washer 9.

A demagnetizing effect may sometimes be caused by sudden changes in load such as a short-circuit placed on the stator. To correct for this demagnetizing tendency, a pair of bars 10 formed of non-magnetic material, such as copper, are positioned axially across the permanent magnet 1 abutting its outer periphery and spaced midway between the salient pole portions. These bars 10 are secured to the end plates 6 in any suitable manner, as by screws 11 with shims 12 between the bars 10 and the end plates 6. The bars 10 and the end plates 6 form a short-circuited coil around the permanent magnet 1 which is threaded by the permanent magnet flux. Any change in the flux of the permanent magnet 1 will set up an opposing current in this short-circuited damping coil so that sudden changes in the flux through the permanent magnet which might ordinarily cause demagnetization are minimized.

It will now be readily apparent that the permanent magnet rotor thus far described provides a shunt flux path from the pole pieces 4 to the end plates 6 which has greater reluctance than the working air gap. Therefore, when the rotor is in place in the stator, only a small portion of the total flux will be by-passed through the shunt gap. However, when the rotor is removed from the stator, the magnet flux will traverse the shunt gap so that the total flux density in the permanent magnet 1 and the pole pieces 4 will follow along a minor hysteresis loop without demagnetization. When the rotor is replaced in the stator the magnet flux density will again increase along this minor loop to its former value.

It was also found desirable to provide a convenient means for adjusting the output voltage of the machine. In a generator actually constructed in accordance with this invention, it was required that the output voltage be rigidly set at 89 volts at no load and 75 volts at full load. In order to compensate for manufacturing variations in the steel of the magnetic circuit, the width of the working air gap, the stator windings, and the quality of the permanent magnet, it was necessary to design the rotor initially to produce approximately 95 volts at no load. Since it was found practically impossible to reduce this extra voltage due to the shunt air gap and the short-circuit damping winding, the arrangement now to be described was provided. A ring 13 of magnetic material, such as steel, is attached to one of the end plates 6 by means of non-magnetic screws 14. The ring 13 is separated from the end plate 6 by shims 15 of varying thickness. The ring 13 provides a path to by-pass some of the flux from the pole pieces 4 to the end plates 6 around the shunt air gap, the amount of flux by-passed determining the amount of voltage drop secured. Thus, the voltage drop can be adjusted to the desired amount by varying the thickness of the shims 15. It was found that with all the shims removed and the ring 13 abutting the pole pieces 4 and the end plates 6 a drop of 13 volts was possible with corresponding lower drops depending on the thickness of the shims 15. It will be readily apparent that this provides a convenient means for adjusting the output voltage since the shims can be inserted and removed merely by removal of one end flange of the machine, the complete removal of the rotor being unnecessary.

It will now be readily apparent that this invention provides an improved permanent magnet rotor for dynamo-electric machines wherein the magnet material is used more economically by establishing the magnet flux density on a higher level minor loop, and also provides means whereby the output voltage can be conveniently adjusted without major modification or dismantling of the machine.

While I have illustrated and described a specific embodiment of this invention, further modifications will occur to those skilled in the art. I desire that it be understood that this invention is not limited to the specific embodiment shown and I intend in the appended claims to cover all modifications which do not depart from the spirit and scope of this invention.

What I claim as new and desire to secure by Letters Patent of the United States is:

1. A permanent magnet motor for dynamoelectric machines comprising a permanent magnet secured to a shaft member and polarized radially to form polar areas at the outer periphery thereof, pole pieces abutting said polar areas of said permanent magnet for concentrating flux, means on said shaft member defining a shunt air gap with said pole pieces for providing a shunt flux path whereby the flux density of said magnet is held at a high level when said rotor is removed and replaced in the stator of a dynamoelectric machine, and means for by-passing a portion of the flux around said shunt air gap to regulate the voltage produced by said dynamoelectric machine.

2. A permanent magnet rotor for dynamoelectric machines comprising a permanent magnet secured to a shaft member and polarized radially to form polar areas at the outer periphery thereof, pole pieces abutting said polar areas of said permanent magnet for concentrating flux, an end plate secured to said shaft and defining a shunt air gap with said pole pieces for providing a shunt flux path whereby the flux density of said magnet is held at a high level when said rotor is removed and replaced in the stator of a dynamoelectric machine, and a ring of magnetic material adjacent said pole pieces and said end plate for by-passing a portion of the flux around said shunt air gap to regulate the voltage produced by said dynamoelectric machine.

3. A permanent magnet rotor for dynamoelectric machines comprising a permanent magnet secured to a shaft member formed of magnetic material, said permanent magnet being polarized radially to form polar areas at the outer periphery thereof, pole pieces formed of magnetic material abutting said polar areas of said permanent magnet for concentrating flux, an end plate formed of magnetic material secured to said shaft member and defining a shunt air gap with said pole pieces for providing a shunt flux path whereby the flux density of said magnet is held at a high level when said rotor is removed and replaced in the stator of a dynamoelectric machine, said end plate being spaced from said permanent magnet, and a ring of magnetic material adjacent said end plate and said pole pieces for by-passing a portion of the flux around said shunt air gap to regulate the voltage produced by said dynamoelectric machine.

4. A permanent rotor for dynamoelectric machines comprising a permanent magnet secured to a shaft member and polarized radially to form polar areas at the outer periphery thereof, pole pieces abutting said polar areas of said permanent magnet for concentrating flux, means secured to said shaft and defining a shunt air gap with said pole pieces for providing a shunt flux path whereby the flux density of said magnet is held at a high level when said rotor is removed and replaced in the stator of a dynamoelectric machine, a closed circuit conductor around said magnet between said polar areas for minimizing demagnetizing flux changes therein, and means for by-passing a portion of the flux around said shunt air gap to regulate the voltage produced by said dynamoelectric machine.

5. A permanent magnet rotor for dynamoelectric machines comprising a permanent magnet secured to a shaft member formed of magnetic material, said permanent magnet being polarized radially to form polar areas at the outer periphery thereof, a plurality of pole pieces formed of magnetic material abutting said polar areas of said permanent magnet for concentrating flux, two end plates formed of magnetic material respectively secured to said shaft at each end of said permanent magnet and defining a shunt air gap with said pole pieces for providing a shunt flux path whereby the flux density of said magnet is held at a high level when said rotor is removed and replaced in the stator of a dynamoelectric machine, said end plates being spaced from said permanent magnet, said pole pieces being secured to said end plates, a plurality of conductors secured to said end plates abutting said permanent magnet between said polar areas forming a closed circuit around said permanent magnet for minimizing demagnetizing flux changes therein, and a ring of magnetic material adjacent one of said end plates and said pole pieces for by-passing a portion of the flux around said shunt gap to regulate the voltage produced by said dynamoelectric machine.

6. A permanent magnet rotor for dynamoelectric machines comprising a permanent magnet secured to a shaft member and polarized radially to form polar areas at the outer periphery thereof, a plurality of pole pieces abutting said polar areas of said permanent magnet for concentrating flux, an end plate secured to said shaft member and defining a shunt air gap with said pole pieces for providing a shunt flux path whereby the flux density of said magnet is held at a high level when said rotor is removed and replaced in the stator of a dynamoelectric machine, said end plate being spaced from said permanent magnet, a ring of magnetic material adjacent said end plate and said pole pieces for by-passing a portion of the flux around said shunt air gap, and means for adjusting the position of said ring with respect to said end plate and said pole pieces to regulate the voltage produced by said dynamoelectric machine.

FRANK W. MERRILL.

REFERENCES CITED

The following references are of record in the file of this patent:

UNITED STATES PATENTS

| Number | Name | Date |
| --- | --- | --- |
| 1,980,808 | Leibing | Nov. 13, 1934 |
| 2,432,117 | Morton | Dec. 9, 1947 |
| 2,461,566 | Morrill | Feb. 15, 1949 |